(12) United States Patent
Washio et al.

(10) Patent No.: US 7,991,614 B2
(45) Date of Patent: Aug. 2, 2011

(54) CORRECTION OF MATCHING RESULTS FOR SPEECH RECOGNITION

(75) Inventors: Nobuyuki Washio, Kawasaki (JP); Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/558,249

(22) Filed: Sep. 11, 2009

(65) Prior Publication Data
US 2010/0004932 A1 Jan. 7, 2010

Related U.S. Application Data

(63) Continuation of application No. PCT/JP2007/055760, filed on Mar. 20, 2007.

(51) Int. Cl.
*G10L 17/00* (2006.01)
*G10L 11/06* (2006.01)
*G10L 15/20* (2006.01)

(52) U.S. Cl. ........ 704/248; 704/210; 704/215; 704/226; 704/233

(58) Field of Classification Search .................. 704/226, 704/233, 210, 215, 248
See application file for complete search history.

(56) References Cited

U.S. PATENT DOCUMENTS

| | | |
|---|---|---|
| 4,984,275 A | 1/1991 | Watanabe et al. |
| 5,121,428 A | 6/1992 | Uchiyama et al. |
| 5,220,609 A | 6/1993 | Watanabe et al. |
| 5,740,318 A * | 4/1998 | Naito et al. ................... 704/253 |
| 5,794,195 A * | 8/1998 | Hormann et al. ............. 704/253 |
| 6,088,670 A | 7/2000 | Takada |

(Continued)

FOREIGN PATENT DOCUMENTS
EP 0 944 036 A1 9/1999
(Continued)

OTHER PUBLICATIONS

Li et al. "Robust Endpoint Detection and Energy Normalization for Real-Time Speech and Speaker Recognition", IEEE Transactions on Speech and Audio Processing, vol. 10, No. 3, Mar. 2002.*

*Primary Examiner* — James S. Wozniak
*Assistant Examiner* — Jialong He
(74) *Attorney, Agent, or Firm* — Greer, Burns & Crain, Ltd.

(57) ABSTRACT

A speech recognition system includes the following: a feature calculating unit; a sound level calculating unit that calculates an input sound level in each frame; a decoding unit that matches the feature of each frame with an acoustic model and a linguistic model, and outputs a recognized word sequence; a start-point detector that determines a start frame of a speech section based on a reference value; an end-point detector that determines an end frame of the speech section based on a reference value; and a reference value updating unit that updates the reference value in accordance with variations in the input sound level. The start-point detector updates the start frame every time the reference value is updated. The decoding unit starts matching before being notified of the end frame and corrects the matching results every time it is notified of the start frame. The speech recognition system can suppress a delay in response time while performing speech recognition based on a proper speech section.

9 Claims, 4 Drawing Sheets

U.S. PATENT DOCUMENTS

| | | | |
|---|---|---|---|
| 6,216,103 B1 * | 4/2001 | Wu et al. | 704/253 |
| 6,236,970 B1 | 5/2001 | Imai et al. | |
| 6,324,509 B1 * | 11/2001 | Bi et al. | 704/248 |
| 6,405,164 B1 * | 6/2002 | Pinai | 704/225 |
| 6,782,363 B2 * | 8/2004 | Lee et al. | 704/248 |
| 7,277,853 B1 * | 10/2007 | Bou-Ghazale et al. | 704/248 |
| 7,412,376 B2 * | 8/2008 | Florencio et al. | 704/206 |
| 2001/0010037 A1 | 7/2001 | Imai et al. | |
| 2003/0061036 A1 * | 3/2003 | Garudadri et al. | 704/208 |
| 2004/0064314 A1 * | 4/2004 | Aubert et al. | 704/233 |
| 2004/0162727 A1 * | 8/2004 | Kiuchi et al. | 704/254 |
| 2005/0055201 A1 * | 3/2005 | Florencio et al. | 704/214 |
| 2005/0171771 A1 * | 8/2005 | Yasunaga et al. | 704/219 |
| 2006/0136210 A1 * | 6/2006 | Menendez-Pidal et al. | 704/256.8 |
| 2006/0241948 A1 * | 10/2006 | Abrash et al. | 704/275 |

FOREIGN PATENT DOCUMENTS

| | | |
|---|---|---|
| EP | 1 517 299 A2 | 3/2005 |
| EP | 1 944 753 A2 | 7/2008 |
| JP | 57-97599 | 6/1982 |
| JP | 60-499 | 1/1985 |
| JP | 62-293299 | 12/1987 |
| JP | B2 2625682 | 4/1988 |
| JP | A 2-236599 | 9/1990 |
| JP | A 7-92989 | 4/1995 |
| JP | B2 3160228 | 6/1998 |
| JP | A 10-301600 | 11/1998 |
| JP | A 2000-250568 | 9/2000 |
| JP | A 2002-258882 | 9/2002 |
| JP | A 2005-31632 | 2/2005 |

* cited by examiner

CORRECTION OF MATCHING RESULTS FOR SPEECH RECOGNITION

This application is a continuation under 35 U.S.C 111(a) of International Application Ser. No. PCT/JP2007/055760, filed Mar. 20, 2007.

FIELD

The present invention relates to speech recognition processing a speech recognition program, and a speech recognition method that receive a sound signal including speech of a user, perform speech recognition processing, and output a recognized word sequence contained in the speech.

In many cases, a conventional speech recognition system has a function of deciding where a speech section (utterance section) of input speech data is located on a time base. Such a speech recognition system calculates features in a frame that has been determined as a speech section, matches the features with an acoustic model and a linguistic model, and outputs the best matching word sequences as recognition results (candidates). To decide where the speech section is located, e.g., the speech recognition system can determine that a speech section has started when the input speech power is continuously more than a reference value (=background noise level+$\alpha$ (threshold value)) for a given period of time (i.e., a given number of frames). Moreover, the speech recognition system can determine that the speech section has ended when the input speech power is continuously less than the reference value for a given period of time.

In the above method for determining a speech section, if the background noise level varies over the threshold value $\alpha$, the noise section can be erroneously determined as a speech section, leading to false recognition. For this reason, a start-point detector that dynamically detects a start point of a speech section in accordance with the maximum energy of input speech has been proposed (see, e.g., Patent Document 1). In the start-point detector, the input speech data is recorded in a memory buffer during the period from the detection of a start point to the detection of an end point of a speech section. Upon detecting the maximum value and the relative maximum of the speech energy of the input speech data, the threshold value is reset and used to detect a new start point again. After the end point is detected, the speech data between the start point and the end point is output.

However, the above start-point detector cannot start decoding processing or the like until the end point of the speech section is determined. Therefore, a response time is increased.

Patent Document 1: Japanese Patent No. 2625682

SUMMARY

According to an aspect of the invention, a speech recognition system includes the following: a feature calculating unit that converts an input sound signal into a feature for each frame; a sound level calculating unit that calculates an input sound level expressed as either power or an amplitude of the sound signal in each frame; a decoding unit that receives the feature of each frame calculated by the feature calculating unit, matches the feature with an acoustic model and a linguistic model recorded in advance, and determines a recognized word sequence to be output based on the matching results, the acoustic model being data obtained by modeling of what feature speech is likely to have, and the linguistic model being data relating to a recognition word; a start-point detector that compares the input sound level calculated by the sound level calculating unit with a reference value to determine a start frame serving as a start point of a speech section and notifies the decoding unit of the start frame; an end-point detector that compares the input sound level calculated by the sound level calculating unit with a reference value to determine an end frame serving as an end point of the speech section and notifies the decoding unit of the end frame; and a reference value updating unit that updates the reference value in accordance with variations in the input sound level after the start frame. When the reference value updating unit updates the reference value, the start-point detector updates the start frame using the updated reference value and notifies the decoding unit of the updated start frame. When the decoding unit starts matching after receiving the feature of each frame calculated by the feature calculating unit and then is notified of the start frame from the start-point detector before being notified of the end frame from the end-point detector, the decoding unit corrects the matching results in accordance with the notified start frame.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

With the above-mentioned configuration, the reference value updating unit updates the reference value in accordance with variations in the input sound level after the start frame, and the start-point detector updates the start frame based on the updated reference value. Thus, the start frame is updated in accordance with the input sound level of the speech included in the input sound signal. Therefore, a false detection of the start point of the speech section due to, e.g., unsteady noise or variations in the input sound level can be automatically corrected. The end-point detector also determines the end frame in accordance with the input sound level. The decoding unit is notified of the start frame updated by the start-point detector and the end frame determined by the end-point detector. When the decoding unit starts matching processing and then is notified of the start frame updated before being notified of the end frame, the decoding unit corrects the matching results in accordance with the updated start frame. That is, the decoding unit can proceed with the matching processing without waiting for the end frame. Therefore, a delay in response time can be suppressed. Moreover, the decoding unit corrects the matching results in accordance with the updated start frame, and thus can output a recognition result based on a proper speech section in which a false detection of the start point has been corrected. Even if the start frame is updated, the decoding unit does not perform the matching processing over again, but corrects the matching results. Thus, the matching results of the matching processing that has already been finished also can be utilized without waste. Consequently a response time is improved, which in turn can suppress a delay in response time while speech recognition is performed based on a proper speech section.

The input sound level may be expressed as either power of the sound signal in each frame or logarithm of the power or an amplitude of the sound signal in each frame or logarithm of the amplitude.

In the speech recognition system, the decoding unit may determine the recognized word sequence based on only the matching results of the features of the frames included in the speech section between the start frame received from the start-point detector and the end frame received from the end-point detector.

With the above-mentioned configuration, the decoding unit can determine the recognized word sequence based on the matching results from which the decoding unit excludes the matching results of the section that is determined as not a speech section by the start-point detector and the end-point detector. Consequently it is possible to reduce the effect of the matching results of the frames having a high probability of noise on the recognition result.

In the speech recognition system, the decoding unit may correct the matching results by assigning weights to the matching results of the feature of each frame, and the decoding unit may perform weighting so that the weights assigned to the matching results of the features of the frames outside the speech section between the start frame received from the start-point detector and the end frame received from the end-point detector are lighter than those assigned to the matching results of the features of the frames within the speech section between the start frame and the end frame.

With the above-mentioned configuration, the decoding unit estimates that the weights assigned to the matching results of the features of the frames that are determined as being outside the speech section are lighter than those assigned to the matching results of the features of the frames within the speech section, thereby determining the recognized word sequence. Therefore, the decoding unit can determine the recognized word sequence by reducing the effect of the matching results of the section that is determined as not a speech section by the start-point detector and the end-point detector. Consequently it is possible to reduce the effect of the matching results of the frames having a high probability of noise on the recognition result. In other words, this configuration reduces the significant effect that a small error of the detection result of the speech section can have on the recognition result, and thus stabilizes the recognition result.

In the speech recognition system, the decoding unit may determine the recognized word sequence to be output by excluding a word containing frames that are not present in the section between the start frame received from the start-point detector and the end frame received from the end-point detector.

With the above-mentioned configuration, the decoding unit can exclude the word pertaining to the frames that are determined as being outside the speech section from the recognized word sequence to be output. Consequently it is possible to reduce the effect of the matching results of the frames having a high probability of noise on the recognition result.

In the speech recognition system, the reference value updating unit may calculate a maximum input sound level in the frames subsequent to the start frame and update the reference value in accordance with the maximum input sound level.

The reference value updating unit updates the reference value based on the maximum input sound level in the frames subsequent to the start frame, and thus allows the input sound level in the speech section to be reflected in the reference value.

In the speech recognition system, the reference value updating unit may gradually reduce the reference value over time.

In general, the volume of the human utterances is likely to be small at the end of speech. The reference value updating unit gradually reduces the reference value over time and can update the reference value in accordance with the tendency of the utterance volume to decrease at the end of speech. The end-point detector determines the end frame based on the reference value thus updated, so that a proper end frame can be determined in accordance with the tendency of the human utterances.

In the speech recognition system, the reference value updating unit may gradually reduce the calculated maximum input sound level over time.

The reference value is updated in accordance with the maximum input sound level, and therefore is updated in accordance with the tendency of the utterance volume to decrease at the end of speech. For example, when the maximum sound level is raised due to random causes such as a temporary sharp rise in the input sound level because a speaker suddenly becomes emotional and the input of sudden loud noise, the reference value cannot be properly set in the subsequent processing. However, this configuration also can prevent such a situation.

According to an aspect of the invention, a speech recognition program stored in a computer-readable recording medium allows a computer to execute the following: feature calculation processing that converts an input sound signal into a feature for each frame; sound level calculation processing that calculates an input sound level expressed as either power or an amplitude of the sound signal in each frame; decoding processing that receives the feature of each frame calculated by the feature calculation processing, matches the feature with an acoustic model and a linguistic model recorded in advance, and outputs a recognized word sequence based on the matching results, the acoustic model being data obtained by modeling of what feature speech is likely to have, and the linguistic model being data relating to a recognition word; start-point detection processing that compares the input sound level calculated by the sound level calculation processing with a reference value to determine a start frame serving as a start point of a speech section; end-point detection processing that compares the input sound level calculated by the sound level calculation processing with a reference value to determine an end frame serving as an end point of the speech section; and reference value updating processing that updates the reference value in accordance with variations in the input sound level after the start frame. When the reference value is updated by the reference value updating processing, the start frame is updated using the updated reference value by the start-point detection processing. When matching is started by the decoding processing after receiving the feature of each frame calculated by the feature calculation processing, and then the start frame is updated by the start-point detection processing before the end frame is determined by the end-point detection processing, the matching results are corrected in accordance with the updated start frame by the decoding processing.

According to an aspect of the invention, a speech recognition method includes the following: calculating a feature by converting an input sound signal into a feature for each frame;

calculating an input sound level expressed as either power or an amplitude of the sound signal in each frame; decoding the feature of each frame by receiving the feature of each frame, matching the feature with an acoustic model and a linguistic model recorded in advance, and outputting a recognized word sequence based on the matching results, the acoustic model being data obtained by modeling of what feature speech is likely to have, and the linguistic model being data relating to a recognition word; determining a start frame serving as a start point of a speech section by comparing the input sound level with a reference value; determining an end frame serving as an end point of the speech section by comparing the input sound level with a reference value; and updating the reference value in accordance with variations in the input sound level after the start frame. When the reference value is updated, the start frame is updated using the updated reference value. When matching is started after receiving the feature of each frame, and then the start frame is updated before the end frame is determined, the matching results are corrected in accordance with the updated start frame.

A recoding medium is a computer-readable recording medium containing the speech recognition program.

The present invention can provide a speech recognition system, a speech recognition program, and a speech recognition method that can suppress a delay in response time while performing speech recognition based on a proper speech section.

Configuration of Speech Recognition System

Figure 1:
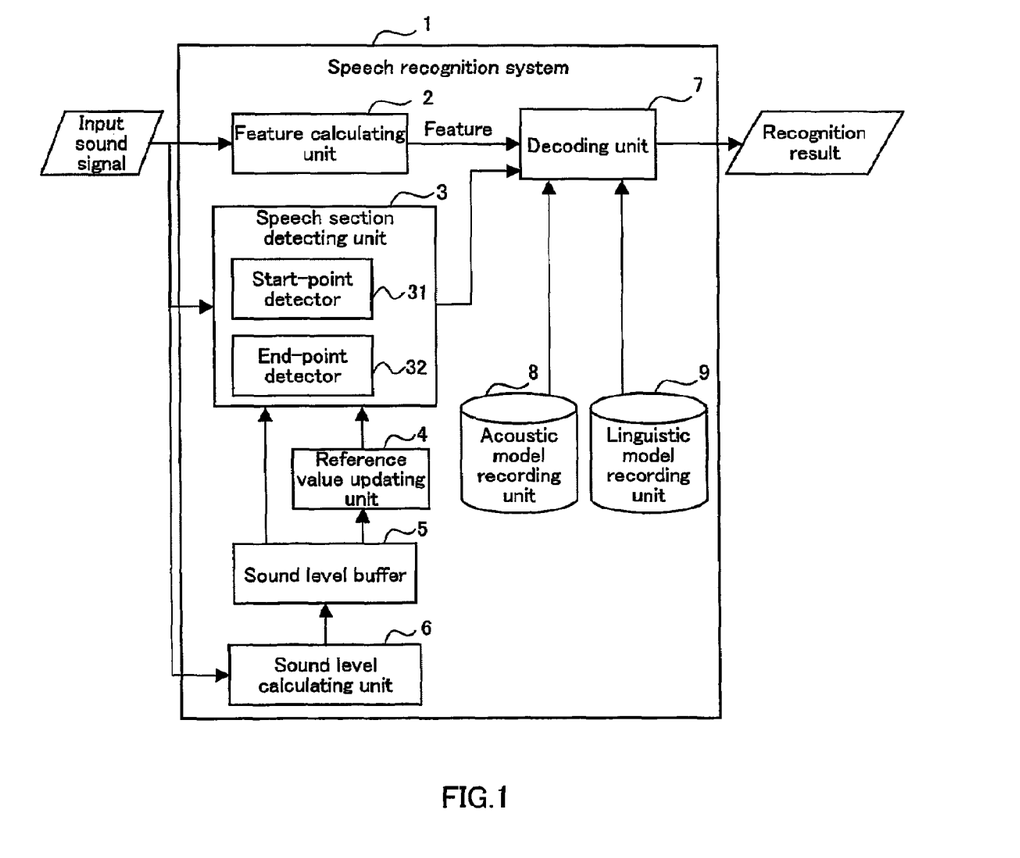
FIG. 1 is a functional block diagram showing a configuration of a speech recognition system.

FIG. 1 is a functional block diagram showing a configuration of a speech recognition system of this embodiment. A speech recognition system 1 shown in FIG. 1 performs speech recognition processing to recognize a word sequence in an input sound signal including user's speech and outputs the recognized word sequence as a recognition result. The speech recognition system 1 is used, e.g., as a speech recognition engine that receives user's speech from a host program such as a speech interactive application and returns the recognition result to the host program.

The speech recognition system 1 includes a feature calculating unit 2, a speech section detecting unit 3, a reference value updating unit 4, a sound level buffer 5, a sound level calculating unit 6, a decoding unit 7, an acoustic model recording unit 8, and a linguistic model recording unit 9.

The speech recognition system can be realized, e.g., by installing a program in any computer such as a personal computer or a computer incorporated into electronic equipment. In other words, the feature calculating unit 2, the speech section detecting unit 3, the reference value updating unit 4, the sound level calculating unit 6, and the decoding unit 7 are implemented by the operations of the CPU of a computer that follows a program for performing the functions of these units. Therefore, the program that allows the computer to perform the functions of the feature calculating unit 2, the speech section detecting unit 3, the reference value updating unit 4, the sound level calculating unit 6, and the decoding unit 7 or a recording medium containing the program is also an embodiment of the present invention. Moreover, the sound level buffer 5, the acoustic model recording unit 8, and the linguistic model recording unit 9 are implemented by a built-in memory of the computer or a memory accessible from this computer.

The feature calculating unit 2 converts the input sound signal into features for each frame. In many cases, features may include MFCC, LPC cepstrum and power, primary or secondary regression coefficients of them, and multidimensional vectors obtained by dimensional compression of these values using a principal component analysis or a discriminant analysis. In this embodiment, however, the features are not particularly limited. The calculated features are stored in an internal memory (not shown) along with information intrinsic to each frame (i.e., frame intrinsic information). The frame intrinsic information is data that shows a frame number indicating where each frame is located from the top, start and end points of each frame, etc.

The decoding unit 7 receives the features of each frame calculated by the feature calculating unit 2, matches them with an acoustic model of the acoustic model recording unit 8 and a linguistic model of the linguistic model recording unit 9, determines a recognized word sequence based on the matching results, and outputs the recognized word sequence as a recognition result. The acoustic model is data obtained by modeling of what feature speech is likely to have. The linguistic model is data relating to a recognition word. For example, the linguistic model includes grammar, recognition vocabulary information, etc.

Specifically the decoding unit 7 performs decoding processing as follows. First, the decoding unit 7 compares the features of each frame with the acoustic model to calculate a phoneme score for each frame included in a speech section. In this case, the acoustic model is obtained, e.g., by modeling of the information about which phoneme is likely to have what feature, and the mainstream of the acoustic model is a phoneme HMM (hidden Markov model) at present. The acoustic model is stored in the acoustic model recording unit 8 in advance.

Moreover, based on the calculated phoneme scores, the decoding unit 7 assumes a plurality of word sequence (sentence) candidates in accordance with the grammar and the recognition vocabulary information stored in the linguistic model recording unit 9, and calculates scores (likelihoods) of the individual word sequence candidates. Then, the decoding unit 7 outputs the word sequence candidate having the best score as a recognition result.

Examples of the grammar stored in the linguistic model recording unit 9 include CFG (context free grammar), FSG (finite state grammar), and a probabilistic model (N-gram) of word concatenation. Although the grammar used in the present invention is not particularly limited, the FSG is used in the following examples. The recognition vocabulary information can include not only an ID for identifying a word, a pronunciation of the word (i.e., the way of uttering the word), and a phoneme sequence equivalent to the pronunciation, but also any other information.

As described above, the matching results of the features of each frame with the acoustic model and the linguistic model by the decoding unit 7 include the phoneme score that indicates the degree of matching of the acoustic model and the features, and the score of each of the word sequence candidates calculated based on the phoneme scores and the linguistic model. However, the matching results are not limited to the above examples. For example, the matching results may be phoneme scores or word scores that are corrected by posterior probabilities. Alternatively the matching results may include optional elements such as duration, a word insertion penalty word cooccurrence probabilities, and confidence based on word posterior probabilities. In some cases, the phoneme score is called likelihood.

The sound level calculating unit 6 calculates speech power for each frame (i.e., frame power) successively from the input sound signal as an input sound level. In the sound level calculating unit 6, e.g., the sum of squares or a mean of the sum of squares of the sound signal in each frame is calculated and logarithmically transformed, so that the resultant value can be the frame power of each frame. The sound level calculating unit 6 also may calculate an amplitude or a mean of amplitudes for each frame as an input sound level instead of the frame power. The input sound level may be either a value calculated in the time domain or a value calculated in the spectral domain using FFT or the like. The calculation method of the input sound level is not limited to the above examples as long as the input sound level is a value that represents the level of the magnitude of a sound.

The frame power of each frame calculated by the sound level calculating unit 6 is recorded in the sound level buffer 5 along with the frame intrinsic information. In this embodiment, the frame power and the features are separately recorded. However, the frame power and the features may be recorded together.

The speech section detecting unit 3 includes a start-point detector 31 and an end-point detector 32. The start-point detector 31 compares the input sound level of each frame that has been calculated by the sound level calculating unit 6 and recorded in the sound level buffer 5 with a reference value to determine a start frame serving as a start point of a speech section, and notifies the decoding unit 7 of the start frame. The end-point detector 32 compares the input sound level of each frame that has been recorded in the sound level buffer 5 with a reference value to determine an end frame serving as an end point of the speech section, and notifies the decoding unit 7 of the end frame.

The start-point detector 31, e.g., reads the input sound level of each frame (in this case, the frame power as an example) successively from the sound level buffer 5 on the time series and compares it with the reference value. In the start-point detector 31, e.g., when the frames having the frame power that is more than the reference value continue for a given time, the frame at the point where the frame power has exceeded the reference value can be determined as a start frame. Similarly in the end-point detector 32, when the frames having the frame power that is less than the reference value continue for a given time, the frame at the point where the frame power has fallen below the reference value can be determined as an end frame. A section between the start frame and the end frame can be determined as a speech section.

The reference value updating unit 4 updates the reference value based on variations in the input sound level in the frames subsequent to the start frame. For example, the reference value updating unit 4 can calculate a sound level (estimated speech level) that can be estimated to be speech rather than noise from the variations in the input sound level, and update the reference value based on this estimated speech level. Specifically the reference value updating unit 4 detects a frame having the maximum frame power in the frames subsequent to the start frame and identifies the maximum frame power as an estimated speech level. Moreover, the reference value updating unit 4 may determine a new reference value candidate by subtracting a certain value β from the detected maximum frame power (estimated speech level), and update the reference value if the reference value candidate is larger than the current reference value.

After updating the reference value, the reference value updating unit 4 notifies the start-point detector 31 and the end-point detector 32 of the updated reference value. The start-point detector 31 updates the start frame using the updated reference value. For example, the start-point detector 31 may reset the start frame by comparing the input sound level of each frame with the updated reference value successively from the first frame at the beginning of the reception of the input sound signal. Alternatively the start-point detector 31 may trace the frames back from the frame at the point where the reference value has been updated to a start frame so as to determine a speech section in which the input sound level is not less than the reference value. The end-point detector 32 also determines the end frame using the updated reference value.

The start-point detector 31 notifies the decoding unit 7 of the determined or updated start frame. The end-point detector 32 also notifies the decoding unit 7 of the determined end frame.

The decoding unit 7 has received the features from the feature calculating unit 2 and started the matching processing before being notified of the end frame from the end-point detector 32, e.g., when it is notified of the start frame for the first time. Thereafter, when the decoding unit 7 is notified of another start frame from the start-point detector 31, it corrects the matching results in accordance with the notified start frame. Then, the decoding unit 7 finishes the matching processing based on the notification of the end frame from the end-point detector 32. If the matching processing has already been performed on the features of the frames subsequent to the end frame, the decoding unit 7 corrects the matching results, e.g., by discarding the matching results of the frames subsequent to the end frame.

Examples of correcting the matching results in accordance with the updated start frame by the decoding unit 7 are as follows. In a first example, if the start frame is temporally delayed due to updating, the decoding unit 7 can proceed with processing while regarding the matching processing as not having been performed on the frames preceding the updated start frame (i.e., the frames outside the speech section). In other words, the decoding unit 7 can determine a recognized word sequence by excluding the matching results before the start frame. In a second example, among the words that are to be candidates for a recognized word sequence, the decoding unit 7 can exclude the word pertaining to the frames preceding the start frame from the recognition candidates. In a third example, the decoding unit 7 can reduce the weights of the phoneme, word, or word sequence scores in the frames preceding the start frame compared to those in the other frames.

The decoding unit 7 can improve the recognition result e.g., by adding the following processing. In general, it is likely that human utterances at both the beginning and the end of speech are unclear and are also of low power compared to those in other situations. To deal with this problem, the decoding unit 7 may perform the matching processing in a section that is provided by adding several frames to before and after the section (speech section) between the start frame and the end frame. This can prevent the low power utterances at both the beginning and the end of speech from being erroneously determined as frames outside the speech section and cut away.

Moreover, the decoding unit 7 also may perform the matching processing on some of the several frames added to before and after the section (speech section) between the start frame and the end frame. Specifically the decoding unit 7 adds a certain number of frames to before and after the speech section, and sets skipping flags to some of the added frames. In this case, e.g., the decoding unit 7 can increase a proportion of the frames to which the skipping flags are attached as the distance from the original speech section increases. The decoding unit 7 does not perform the matching processing on the frames with the skipping flags. This results in the matching that reflects the probability of speech/noise. Thus, the adverse effect of the frames having a high probability of noise can be reduced. Incidentally the speech section detecting unit 3 may add the frames on both ends of the speech section and set the skipping flags.

The speech recognition system 1 has been described, but the present invention is not limited to the above configuration.

For example, the speech section detecting unit 3 may notify the feature calculating unit 2 in addition to the decoding unit 7 of the start point and the end point of the speech section, and the feature calculating unit 2 may calculate the features of each frame only in the notified speech section and send them to the decoding unit 7. This configuration can reduce the load of the feature calculating unit 2. In the example shown in FIG. 1 the acoustic model recording unit 8 and the linguistic model recording unit 9 are placed in the speech recognition system 1, but also may be placed outside the speech recognition system 1.

Operation Example of Speech-Recognition System

Figure 2:
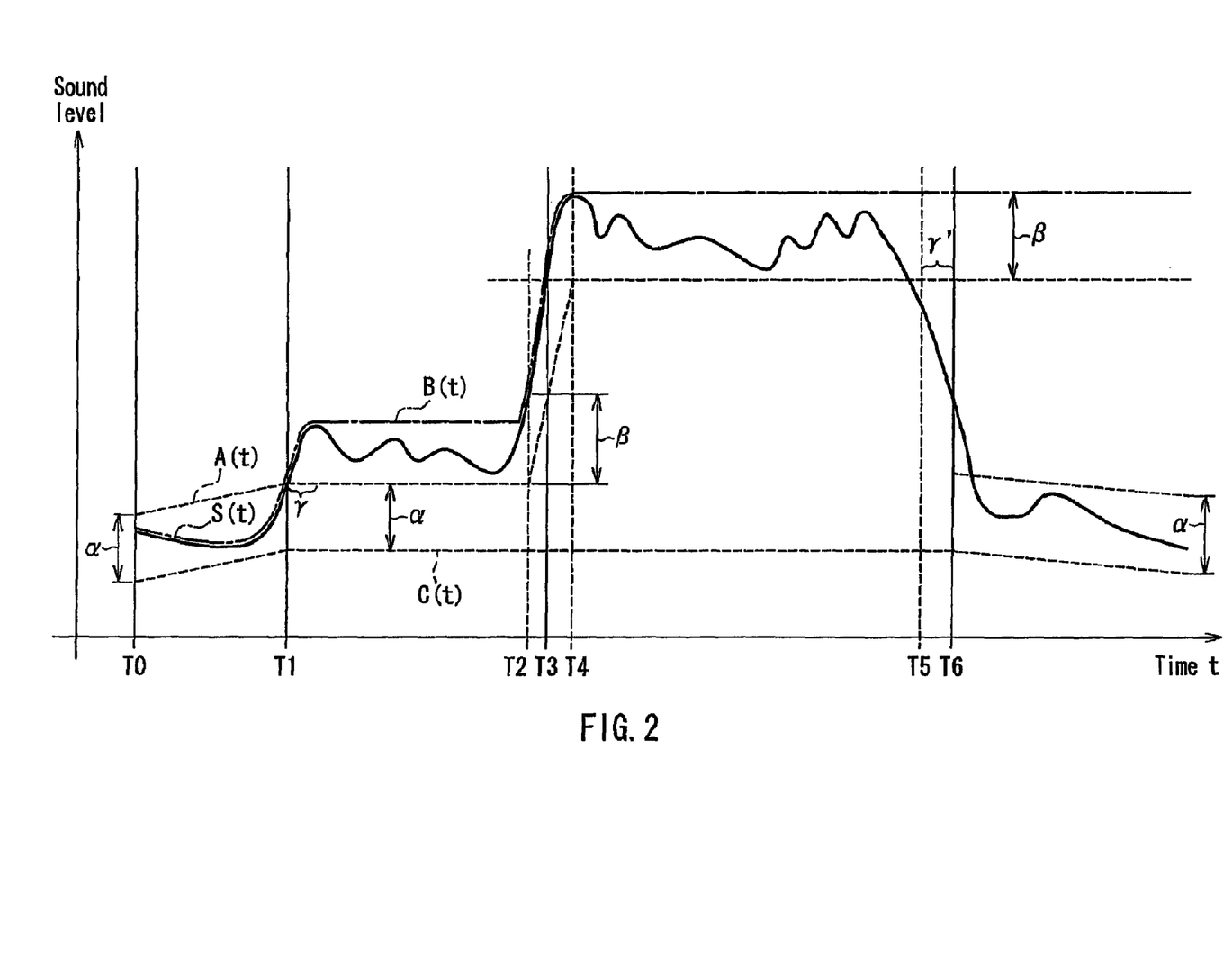
FIG. 2 is a graph showing transitions of an input sound level of an input sound signal, a reference value, etc. over time.

Next, an operation example of the speech recognition system 1 will be described with reference to FIG. 2 as well as FIG. 1. FIG. 2 is a graph showing the transitions of an input sound level of an input sound signal, a reference value, etc. over time. In the graph of FIG. 2, the vertical axis represents a sound level and the horizontal axis represents a time t. The function S(t) expressed by a thick line indicates the transition of the input sound level over time. The function A(t) expressed by a thick dotted line indicates the transition of the reference value over time. The function B(t) expressed by an alternate long and short dash line indicates the transition of the estimated speech level over time. The function C(t) expressed by a thin dotted line indicates the transition of the estimated background noise level over time.

As an example of this embodiment, the transition of the input sound level over time, as indicated by the function S(t), is represented by the frame power of each frame calculated by the sound level calculating unit 6. Therefore, although S(t) is illustrated as a continuous function in FIG. 2, it is actually a set of discrete values for each frame. In FIG. 2, the time t is not a continuous value, but a discrete value corresponding to each frame. The estimated speech level B(t) is defined as the maximum value of the frame power between T0 and the time t. In this case, B(t) can be calculated by the reference value updating unit 4 that retrieves the frame power of each frame recorded in the sound level buffer 5.

In the example shown in FIG. 2, the input sound signal starts to be input at T0. The input sound level S(t)< the reference value A(t) in the range of T0 to T1. The input sound level S(t) exceeds the reference value A(t) at T1. Thereafter, S(t)>A(t) is maintained for a while. When S(t)>A(t) continues for a given time (represented by γ in FIG. 2), the start-point detector 31 determines T1 at which S(t)>A(t) is established as a start point of a speech section. That is, the start-point detector 31 determines the frame at T1 as a start frame. The given time γ is a waiting time to avoid a false reaction to noise in a short time and can be derived, e.g., from the shortest word length.

In the range of T1 to T2, the reference value A(t) is a value obtained by adding a certain value α to the estimated background noise level C(t), i.e., A(t)=C(t)+α. The estimated background noise level C(t) may be, e.g., either a value calculated based on the input sound level S(t) by the reference value updating unit 4 or a value recorded in advance.

As an example of this embodiment, the estimated background noise level is calculated from the input sound level in a non-speech section. The calculation may use, e.g., a mean (moving average) of the input sound levels of the newest N frames or an IIR filter as shown in the following formula.

$$C(t)=p*S(t)+(1-p)*S(t-1)\ (0<p<1)$$

The input sound level S(t) starts to sharply rise slightly before T2, and B(t) also starts to increase with a rise in S(t). Then, a value obtained by subtracting a certain value β from the estimated speech level B(t), i.e., B(t)−β becomes larger than C(t)+α at T2. In this case, the reference value updating unit 4 updates the reference value to A(t)=B(t)−β. That is, the reference value updating unit 4 updates the reference value to A(t)=B(t)−β when the estimated speech level B(t) increases to satisfy the relationship B(t)−β>C(t)+α. Thus, the reference value updating unit 4 can update the reference value A(t) to a proper value in accordance with the speech level. In the range of T2 to T4, the reference value updating unit 4 does not have to update the reference value A(t) every increase in the estimated speech level B(t), and may update the reference value A(t), e.g., at regular intervals.

The start-point detector 31 updates the start frame of the speech section in conjunction with the updating of the reference value A(t) by the reference value updating unit 4. For example, the start-point detector 31 updates the start frame at T4 in the following manner. The start-point detector 31 compares the input sound level S(t) of each frame with the reference value A(T4) on the time series from T0. When the frames with S(t)>A(T4) continue for a given time (γ), the frame at the point (i.e., T3) where S(t) exceeds A(T4) can be determined as a start frame. Moreover, the start-point detector 31 may trace the time series back from T4 and compare S(t) of each frame with A(T4), thereby determining a start frame. Thus, the start frame of the speech section is updated from the frame at T1 to the frame at T3. Since the estimated speech level B(t) is not updated after T4, the reference value A(t) also remains constant until T5.

For example, in the section between T1 and T3 of FIG. 2, if the input sound level is temporarily increased due to speech noise such as an echo, the section between T1 and T3 is actually a noise section. In this case, first, the start-point detector 31 incorrectly determines T1 as a start point of a speech section. However, as a result of the subsequent updating of the reference value A(t) at T4, the incorrect start time (T1) can be corrected to the right start time (T3).

At T5, the input sound level S(T5) falls below the reference value A(T5), and then S(t)<A(t) is maintained. When S(t)<A(t) continues for a given time (e.g., represented by γ' in FIG. 2), namely until T6, the end-point detector 32 determines T5 as an end point of the speech section. That is, the end-point detector 32 determines the frame at T5 as an end frame. The given time γ' is a waiting time to avoid a false detection of the end point of speech caused by temporary silent such as a pause between words or a Japanese double consonant during the speech. As described above, the end-point detector 32 determines the end point by comparing the input sound level S(t) at the time t with the reference value A(t) at the same time t. Therefore, the end point can be determined based on the reference value A(t) that is properly updated in accordance with the estimated speech level B(t). Consequently e.g., it is possible to prevent the noise section after the end of the speech from being erroneously determined as a speech section.

The reference value updating unit 4 updates the reference value A(t) after T6 (the end point of the speech section) to a value based on the estimated background noise level C(t), i.e., A(t)=C(t)+α. Thus, the initial value of the reference value to be used for detecting the next speech is based on the estimated background noise level. The reference value updating unit 4 does not have to clear the reference value after the end of the speech section. In other words, a start point of the next speech section may be detected while the reference value is based on the maximum input sound level, i.e., A(t)=B(t)−β instead of the estimated background noise level. In the example shown in FIG. 2, although a start point of the next speech section is detected while the maximum input sound level B(t) remains unchanged after the end of the speech section, the maximum input sound level B(t) may be reset to its initial value every time the speech section is ended.

Operation Example of Decoding Unit 7

Next, an operation example of the decoding unit 7 when the input sound level varies as shown in FIG. 2 will be described. In the example shown in FIG. 2, the start-point detector 31 notifies the decoding unit 7 of the frame at T1 as a start frame after a given time γ has passed from T1. Then, after the start point is updated at T4, the start-point detector 31 notifies the decoding unit 7 of the frame at T3 as a start frame. Subsequently the decoding unit 7 is notified of the frame at T6 as an end frame after T6.

The decoding unit 7 starts the matching processing when notified of the frame at T1 as a start frame. As described above, e.g., the decoding unit 7 compares the features of each frame after T1 with the acoustic model to calculate a phoneme score for each frame. Based on these phoneme scores, the decoding unit 7 produces a plurality of word sequence candidates in accordance with the linguistic model and calculates scores of the individual word sequence candidates.

If the matching processing has already been performed on the frames after T1 when the decoding unit 7 is notified of the frame at T3 as a start frame (this is more likely to occur as the interval between T3 and T4 increases), the decoding unit 7 corrects the matching results so that the matching results of the frames after T3 take priority over those of the frames before T3.

Hereinafter, several specific examples of correcting the matching results will be described. In a first example, the decoding unit 7 discards the matching results of the frames before T3. For example, the decoding unit 7 replaces the phoneme scores of the frames before T3 with specified worst (minimum) values, and recalculates the word scores that have been determined using those phoneme scores. In this case, the decoding unit 7 allows the phoneme scores with the worst values not to be reflected in the word scores by pruning the recognition candidates. Thus, the decoding unit 7 can proceed with the matching processing of the frames after T3 while regarding the matching processing as not having been performed on the frames before T3.

In a second example, among the words that are included in the word sequence candidates, the decoding unit 7 excludes the word pertaining to the frames before T3 from the word sequence candidates. For example, if a word consists of only the frames before T3, the decoding unit 7 may exclude the word from the word sequence candidates. Moreover, if a word includes at least a certain proportion of the frames before T3, the decoding unit 7 may exclude the word. When N-gram is used as a linguistic model the decoding unit 7 also recalculates the linguistic scores, since the word order is changed by the exclusion of the word candidates.

In a third example, the decoding unit 7 multiplies the phoneme score of each frame by a weighting factor to make the frames after T3 different from those before T3 in the weighting factor. As an example, a score Sc (W, t0, tn) of a word sequence candidate W containing the frames in the range of t0 to tn is expressed by the following formula 1. In the formula 1, Sc (W[i]) represents a phoneme score corresponding to the ith frame of the word sequence candidate W $$Sc(W, t0, tn) = \sum_{i=t0}^{tn} Sc(W[i]) \quad \text{[Formula 1]}$$

Using the weighting factor, i.e., weight [i] (0≦weight [i]≦1) indicating the probability of speech/noise, the score Sc (W, t0, tn) of the word sequence candidate W can be calculated from the following formula 2.

$$Sc(W, t0, tn) = \sum_{i=t0}^{tn} \{Sc(W[i]) \times \text{weight}[i]\} \quad \text{[Formula 2]}$$

The decoding unit 7 calculates the scores of all the word sequence candidates using the formula 2, so that the probability of speech/noise of each frame can be reflected in the score of each of the word sequence candidates. In other words, the score of each frame is adjusted by the weight [i]. For example, the decoding unit 7 calculates the scores by setting the weight [i] of the frames before T3 lower than that of the frame at T3. Consequently it is possible to reduce the effect of the frames that are determined as being outside the speech section and having a high probability of noise on the scores.

As an example, if the frame at T3 is the $t_{T3}$th frame ($i=t_{T3}$), the decoding unit 7 can set the weight [i] 0 where $t0 \leq i < t_{T3}-10$, the weight [i]=0.7 where $t_{T3}-10 \leq i \leq t_{T3}$, and the weight [i] 1 where $t_{T3} < i \leq tn$.

For example, the decoding unit 7 may set the weight [i] of a certain number of frames before and after T3 so as to increase gradually from the noise section to the speech section. This can provide scores that reflect the probability of speech/noise in an ambiguous section that is difficult to distinguish between the noise section and the speech section. Moreover, the decoding unit 7 may set the weight [i] of at least some of the certain number of frames before and after T3 to 0, thereby skipping these frames.

In a fourth example, the decoding unit 7 adds a penalty to the phoneme score of each frame, and the score Sc (W, t0, tn) of the word sequence candidate W can be calculated from the following formula 3.

$$Sc(W, t0, tn) = \sum_{i=t0}^{tn} \{Sc(W[i]) + \text{penalty}[i]\} \quad \text{[Formula 3]}$$

In this case, the plus and minus signs of penalty [i] depend on the choice of the score. For example, when a logarithmic likelihood is used as a phoneme score, the score is generally a negative value and becomes worse as the value increases in the negative direction. Therefore, if the frame at T3 is the $t_{T3}$ frame ($i=t_{T3}$), the decoding unit 7 can set the penalty [i]=−∞ (or a specified minimum value) where $t0 \leq i < t_{T3}-10$, the penalty [i]=−3 where $t_{T3}-10 \leq i \leq t_{T3}$, and the penalty [i]=0 where $t_{T3} < i \leq tn$. On the contrary when the score is a value of not more than 0 such as a Euclidean distance, the decoding unit 7 may set the penalty [i]>0 in a section where the penalty is added.

The examples of processing to correct the matching results by the decoding unit 7 have been described, but are not limited thereto. If the matching processing has not yet been performed on the frame at T3 when the decoding unit 7 is notified of the frame at T3 as a start frame, the decoding unit 7 can discard the matching results that have been obtained so far and start another matching processing from the frame at T3.

If the matching processing has already been performed on the frames after T5 when the decoding unit 7 is notified of the frame at T5 as an end frame, the decoding unit 7 finishes the matching processing and corrects the matching results. If the matching processing has not yet been performed on the frames after T5, the decoding unit 7 does not finish the matching processing until the matching processing proceeds to the frame at T5. In this case, the decoding unit 7 also may perform the matching processing on a certain number of frames after T5. Then, e.g., the decoding unit 7 may assign weights to the frames near the end point of the speech section by using the weight [i] in the same manner as described above.

After finishing the matching processing based on the notification of the end frame of the speech section, the decoding unit 7 outputs the word sequence candidate having the best score of all the scores of the word sequence candidates as a recognition result. Thus, the recognition result can be obtained for the speech section that is properly corrected in accordance with the input sound level. In the above operation example, the decoding unit 7 starts the matching processing before the end frame is determined, and corrects the matching results at the timing of the updating of the start frame and the determination of the end frame. Therefore, the waiting time can be reduced compared to the case where the matching processing is started after determining the end frame.

Modified Example of Estimated Speech Level B(t)

In the example shown in FIG. 2, the estimated speech level B(t) is determined in such a manner that the reference value updating unit 4 calculates the maximum value of the frame power. The other examples of the estimated speech level that can be calculated by the reference value updating unit 4 are as follows.

(a) The maximum value of each frame power that is determined after the input sound signal has been processed by at least one selected from a HPF, a BPF, a LPF, a noise canceller, a spectral subtraction, and an echo canceller.

(b) The maximum value of an envelope of each frame power.

(c) The maximum value of an envelope of each frame power that is determined after the input sound signal has been processed by at least one selected from a HPF, a BPF, a LPF, a noise canceller, a spectral subtraction, and an echo canceller.

When the reference value updating unit 4 calculates (a) as an estimated speech level, the frame power can be determined with respect to the signal from which unwanted components such as noise have been removed. Moreover, when the reference value updating unit 4 calculates (b) as an estimated speech level, it is possible to suppress a rapid change in the estimated speech level due to the effect of unsteady noise that is superimposed on the speech.

The envelope in (b) can be obtained, e.g., with an IIR filter. The following is an example in which the reference value updating unit 4 uses the IIR filter to calculate the maximum value of the envelope of each frame power as an estimated speech level. In this example, the estimated speech level in the ith frame is represented by A[i] and the input sound level (frame power) of the ith frame is represented by S[i]. In the ith frame, the reference value updating unit 4 calculates $A[i]=S[i]$ if $S[i] \geq A[i-1]$.

That is, if the input sound level is not less than the estimated speech level in the previous frame, i.e., if the input sound level is the maximum value, the reference value updating unit 4 updates the estimated speech level to the maximum value of the input sound level. On the other hand, the reference value updating unit 4 calculates $A[i]=k \times S[i]+(1-k) \times A[i-1]$ if $S[i] < A[i-1]$, where $0 < k < 1$. The above formula is an example of an expression of the first-order IIR filter. The false reaction to sudden noise is reduced as the coefficient k is closer to 0.

The reference value updating unit 4 may calculate $A[i]=k' \times S[i]+(1-k') \times A[i-1]$ also if $S[i] \geq A[i-1]$.

Since the sudden noise causes a sharp rise in the input sound level the false reaction can be suppressed by smoothing the input sound level with k'.

Other Modified Examples of Estimated Speech Level B(t) and Reference Value A(t)

The reference value updating unit 4 can gradually reduce the estimated speech level over time after a given time has passed from the start frame determined by the start-point detector 31. Accordingly the reference value updating unit 4 also gradually reduces the reference value. As a result, the reference value is reduced with a decrease in power of the utterance at the end of speech. Specifically in the ith frame, the reference value updating unit 4 calculates $A[i]=S[i]$ if $S[i] \geq A[i-1]$ (i.e., if the input sound level is the maximum value).

The estimated speech level is updated to the maximum value of the input sound level. On the other hand, the reference value updating unit 4 calculates $A[i]=m \times S[i-1]$ if $S[i] < A[i-1]$, where m is a given coefficient. The value S[i] may satisfy either $S[i] \geq 0$ (0 is the minimum value) or $S[i] \leq 0$ (0 is the maximum value) depending on the measurement method of the frame power (i.e., the way of taking an origin). The estimated speech level A[i] is attenuated over time by setting $m<1$ for $S[i] \geq 0$ and $m>1$ for $S[i] \leq 0$.

The method for gradually reducing the estimated speech level is not limited to the above. For example, the reference value updating unit 4 may start processing to gradually reduce the estimated speech level after a given number of frames have passed from the start frame. Moreover, the reference value updating unit 4 may gradually reduce the reference value instead of gradually reducing the estimated speech level.

If the reference value determined by the estimated speech level is less than that determined by the estimated background noise level, namely $B(t)-\beta<C(t)+\alpha$, the processing to reduce the estimated speech level may be stopped.

The modified examples of how to determine the estimated speech level and the reference value have been described, but are not limited thereto. For example, the reference value updating unit 4 can perform the same calculation even using the amplitude instead of the frame power.

Processing of Speech Section Detecting Unit 3

Figure 3:
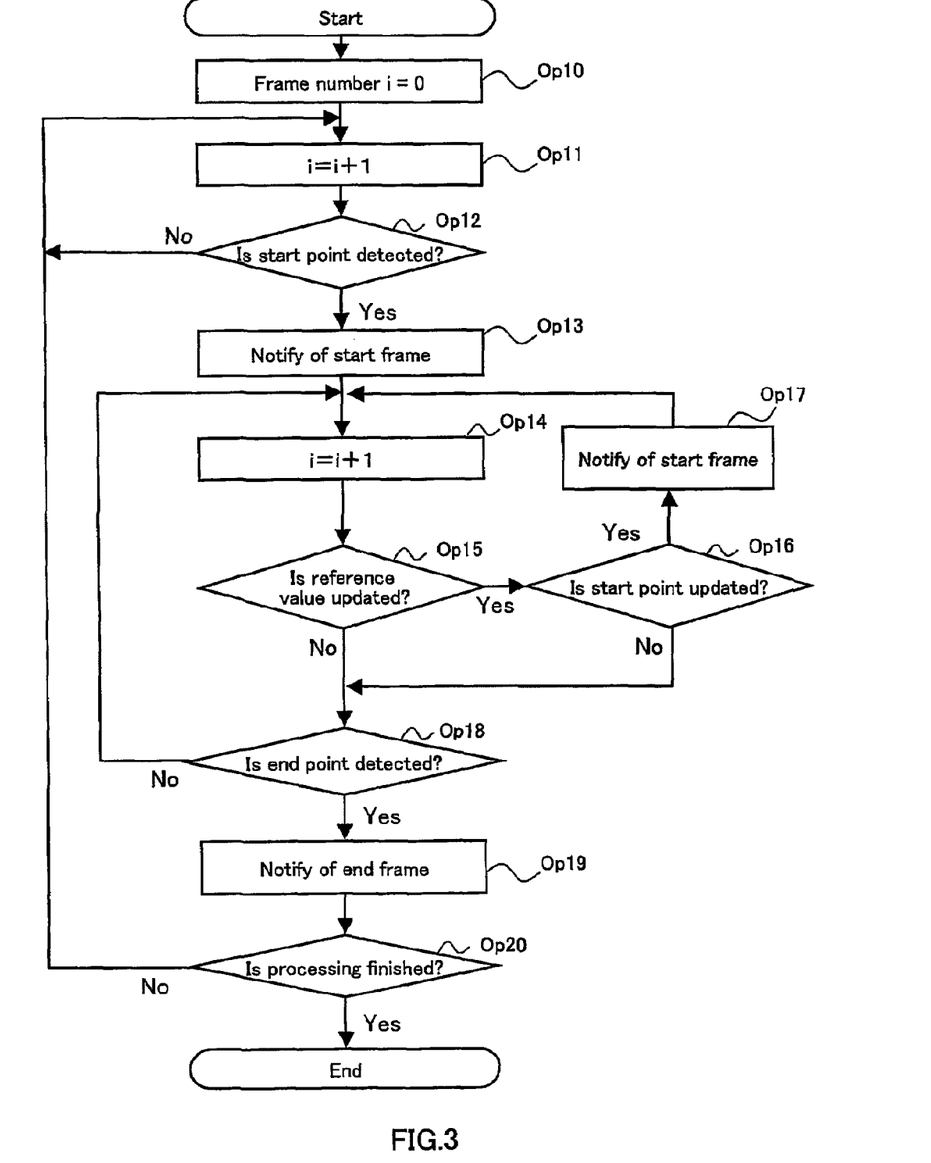
FIG. 3 is a flowchart showing a flow of processing in a speech section detecting unit.

FIG. 3 is a flowchart showing a flow of processing in the speech section detecting unit 3 to achieve the operation as described with reference to FIG. 2. In FIG. 3, first, the speech section detecting unit 3 initializes the frame number i to "0" (at Op10). In this embodiment, the frame number indicates where each frame is located from the top.

After the initialization, the speech section detecting unit 3 adds 1 to i (at Op11), and the start-point detector 31 determines whether or not a start point of a speech section is present in the ith frame (at Op12). The start-point detector 31 can make such a determination, e.g., based on whether or not the input sound level continues to be more than the reference value in all the (i–L)th to ith frames. In this case, L is a given constant. The input sound level in each of the (i–L)th to ith frames is recorded in the sound level buffer 5.

If it is determined that the start point of the speech section is not present (i.e., "No" at Op12), 1 is added to i (at Op11), and then the detection processing (at Op12) is repeated. If it is determined that the start point of the speech section is present (i.e., "Yes" at Op12), the start-point detector 31 notifies the decoding unit 7 of any of the (i–L)th to ith frames as a start frame (at Op13). For example, the start-point detector 31 may notify the decoding unit 7 of the frame number (i–L) by determining the (i–L)th frame whose input sound level exceeds the reference value first as a start frame.

After the notification of the start frame, the speech section detecting unit 3 adds 1 to the frame number i (at Op14) and judges whether the reference value is updated (at Op15). As described above, the reference value updating unit 4 calculates the reference value based on the input sound level for each frame. Therefore, the speech section detecting unit 3 inquires of the reference value updating unit 4 whether or not the reference value is updated every time the frame number i increases by 1.

If it is determined that the reference value is updated (i.e., "Yes" at Op15), the start-point detector 31 determines a start point again based on the updated reference value (at Op16). As a result, if the start point is updated, the start-point detector 31 notifies the decoding unit 7 of the updated start frame (at Op17).

If it is determined that the reference value is not updated (i.e., "No" at Op15), the end-point detector 32 determines whether or not an end point of the speech section is present (at Op18). The end-point detector 32 can make such a determination, e.g., based on whether or not the input sound level continues to be less than the reference value in all the (i–M)th to ith frames. In this case, M is a given constant.

If it is determined that the end point of the speech section is not present (i.e., "No" at Op18), the processing in Op14 to Op17 is repeated. Thus, the start point is updated in accordance with a change in the reference value until the end point is detected.

If it is determined that the end point of the speech section is present (i.e., "Yes" at Op18), the end-point detector 32 notifies the decoding unit 7 of an end frame. That is, the end-point detector 32 notifies the decoding unit 7 of any of the (i–M)th to ith frames as the end frame (at Op19). For example, the end-point detector 32 may notify the decoding unit 7 of the frame number (i–M) by determining the (i–M)th frame whose input sound level falls below the reference value first as an end frame. Consequently the decoding unit 7 is notified of both the start frame and the end frame. In other words, the speech section detecting unit 3 detects the start point and the end point and notifies the decoding unit 7 of the section between the start point and the end point as a speech section.

The processing in Op11 to Op19 is repeated until the speech recognition system 1 judges that the processing is finished (i.e., "Yes" at Op20). For example, it is determined that the processing is finished when no input sound signal is received.

Processing of Decoding Unit 7

Figure 4:
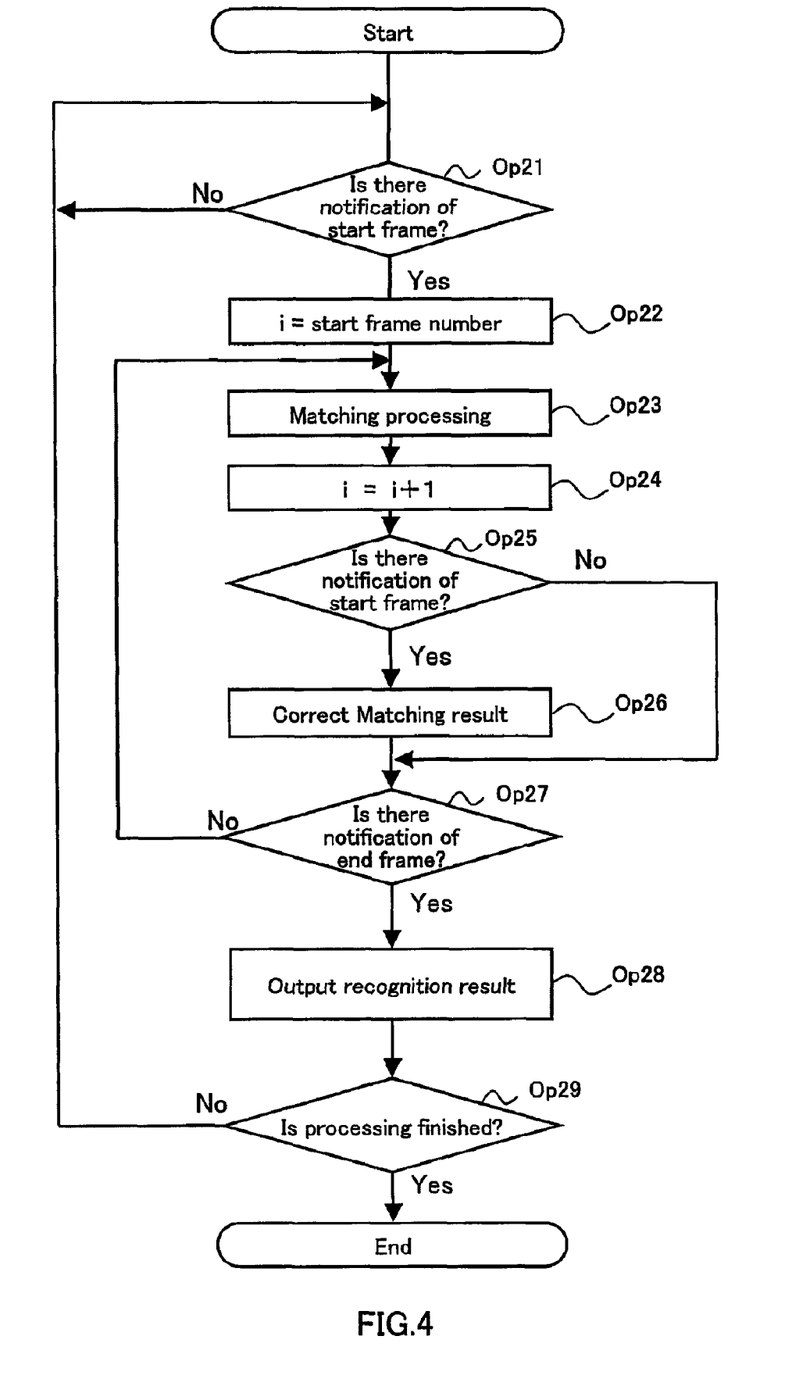
FIG. 4 is a flowchart showing a flow of processing in a decoding unit.

FIG. 4 is a flowchart showing a flow of processing in the decoding unit 7 to achieve the operation as described with reference to FIG. 2. In FIG. 4, the decoding unit 7 is on standby until it is notified of the start frame from the start-point detector 31 (at Op21). When the decoding unit 7 is notified of the start frame, it sets the frame number i as a start frame number (at Op22). Then, the decoding unit 7 performs matching processing (at Op23), taking the frame with the frame number i into account and adds 1 to the frame number i (at Op24). In the matching processing, as described above, the features of each frame are matched with the acoustic model and the linguistic model.

If there is a notification of the start frame from the start-point detector 31 after the matching processing has been started (i.e., "Yes" at Op25), the decoding unit 7 corrects the matching results that have been obtained so far (at Op26). The details of this correction processing have been described above. The decoding unit 7 repeats the matching processing in Op23 and the processing in Op24 to Op26 until it is notified of the end frame (i.e., "Yes" at Op27).

If there is a notification of the end frame j from the end-point detector 32 (i.e., "Yes" at Op27), the decoding unit 7 does not perform the matching processing on the frames subsequent to the jth frame, but provides a recognition result using the matching results that have been obtained so far and outputs the recognition result (at Op28). Thus, the matching processing is performed on the frames between the start frame and the end frame. If the start frame is updated during the matching processing, the matching results are corrected in accordance with the updated start frame.

The processing in Op21 to Op28 is repeated until the speech recognition system 1 judges that the processing is finished (i.e., "Yes" at Op29). For example, it is determined that the processing is finished when no input sound signal is received.

The processing of the decoding unit 7 shown in FIG. 4 is an example and not limited thereto. For example, although the decoding unit 7 sets the frame number to i=start frame number in Op22, the frame number may be set to i=start frame number−constant N. Thus, the matching processing starts with the frame that is located N frames before the start frame. In such a case, the decoding unit 7 may multiply the processing results (e.g., scores) of the N frames before the start frame by a weighting factor to reduce their weights. Similarly after being notified of the end frame, the decoding unit 7 may continue the matching processing to the frame that is located M (given number) frames after the end frame.

In the processing shown in FIG. 4, the decoding unit 7 performs the matching processing only on the frames between the start frame and the end frame. However, the decoding unit 7 may perform the matching processing on all the frames regardless of the start frame and the end frame, and then correct the matching results in accordance with the notified start frame and end frame. For example, the decoding unit 7 can calculate word sequence candidates and their scores included in the input sound signal without determining a speech section by a word spotting technology or the like. The decoding unit 7 can correct the word sequence candidates and their scores thus calculated based on the notified start frame and end frame. This correction can be performed in the same manner as the above correction of the matching results.

In the above embodiment, although the speech recognition system 1 is implemented by a computer, a program that allows the computer to perform the functions of the speech recognition system 1 or a recording medium containing this program is also an embodiment of the present invention. Moreover, the speech recognition system 1 also can be referred to as a speech recognition apparatus.

The present invention is useful for a speech recognition system that can suppress a delay in response time while performing speech recognition based on a proper speech section.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A speech recognition system implemented by a processor comprising:
a feature calculating unit that converts, by the processor, an input sound signal into a feature for each frame;
a sound level calculating unit that calculates, by the processor, an input sound level expressed as either power of the sound signal in each frame or logarithm of the power or an amplitude of the sound signal in each frame or logarithm of the amplitude;
a decoding unit that receives the feature of each frame calculated by the feature calculating unit, matches, by the processor, the feature with an acoustic model and a linguistic model recorded in advance, and determines a recognized word sequence to be output based on the matching results, the acoustic model being data obtained by modeling of what feature speech is likely to have, and the linguistic model being data relating to a recognition word;
a start-point detector that compares, by the processor, the input sound level calculated by the sound level calculating unit with a reference value to determine a start frame serving as a start point of a speech section and notifies the decoding unit of the start frame;
an end-point detector that compares, by the processor, the input sound level calculated by the sound level calculating unit with a reference value to determine an end frame serving as an end point of the speech section and notifies the decoding unit of the end frame; and
a reference value updating unit that updates, by the processor, the reference value in accordance with variations in the input sound level after the start frame,
wherein when the reference value updating unit updates the reference value, the start-point detector updates the start frame using the updated reference value and notifies the decoding unit of the updated start frame, and
when the decoding unit starts matching the feature with the acoustic model and the linguistic model and then is notified of the updated start frame from the start-point detector after starting the matching and before being notified of the end frame from the end-point detector, the decoding unit corrects the already existing matching results of the decoding unit in accordance with the notified updated start frame.

2. The speech recognition system according to claim 1, wherein the decoding unit determines the recognized word sequence based on only the matching results of the features of the frames included in the speech section between the start frame received from the start-point detector and the end frame received from the end-point detector.

3. The speech recognition system according to claim 1, wherein the decoding unit corrects the matching results by assigning weights to the decoding results of the feature of each frame, and
the decoding unit performs weighting so that the weights assigned to the matching results of the features of the frames outside the speech section between the start frame received from the start-point detector and the end frame received from the end-point detector are lighter than those assigned to the matching results of the features of the frames within the speech section between the start frame and the end frame.

4. The speech recognition system according to claim 1, wherein the decoding unit determines the recognized word sequence to be output by excluding a word containing frames that are not present in the section between the start frame received from the start-point detector and the end frame received from the end-point detector.

5. The speech recognition system according to claim 1, wherein the reference value updating unit calculates a maximum input sound level in the frames subsequent to the start frame and updates the reference value in accordance with the maximum input sound level.

6. The speech recognition system according to claim 1, wherein the reference value updating unit gradually reduces the reference value over time.

7. The speech recognition system according to claim 5, wherein the reference value updating unit gradually reduces the calculated maximum input sound level over time.

8. A speech recognition program stored in a non-transitory computer-readable recording medium that allows a computer to execute:
feature calculation processing that converts an input sound signal into a feature for each frame;
sound level calculation processing that calculates an input sound level expressed as power or an amplitude of the sound signal in each frame;
decoding processing that receives the feature of each frame calculated by the feature calculation processing, matches the feature with an acoustic model and a linguistic model recorded in advance, and outputs a recognized word sequence based on the matching results, the acoustic model being data obtained by modeling of what feature speech is likely to have, and the linguistic model being data relating to a recognition word;
start-point detection processing that compares the input sound level calculated by the sound level calculation processing with a reference value to determine a start frame serving as a start point of a speech section;
end-point detection processing that compares the input sound level calculated by the sound level calculation processing with a reference value to determine an end frame serving as an end point of the speech section; and
reference value updating processing that updates the reference value in accordance with variations in the input sound level after the start frame,
wherein when the reference value is updated by the reference value updating processing, the start frame is updated using the updated reference value by the start-point detection processing, and
when matching is started by the decoding processing and then the start frame is updated by the start-point detection processing after the matching is started and before the end frame is determined by the end-point detection processing, the already existing matching results by the decoding processing are corrected in accordance with the updated start frame by the decoding processing.

9. A speech recognition method executed by a processor comprising:
calculating, by the processor, a feature by converting an input sound signal into a feature for each frame;
calculating, by the processor, an input sound level expressed as power or an amplitude of the sound signal in each frame;

decoding, by the processor, the feature of each frame by receiving the feature of each frame, matching the feature with an acoustic model and a linguistic model recorded in advance, and outputting a recognized word sequence based on the matching results, the acoustic model being data obtained by modeling of what feature speech is likely to have, and the linguistic model being data relating to a recognition word;

determining, by the processor, a start frame serving as a start point of a speech section by comparing the input sound level with a reference value;

determining, by the processor, an end frame serving as an end point of the speech section by comparing the input sound level with a reference value; and updating, by the processor, the reference value in accordance with variations in the input sound level after the start frame, wherein when the reference value is updated, the start frame is updated using the updated reference value, and when matching is started and then the start frame is updated after the matching is started and before the end frame is determined, the already existing matching results are corrected in accordance with the updated start frame.

* * * * *